US012300947B2

(12) United States Patent
Messadek

(10) Patent No.: US 12,300,947 B2
(45) Date of Patent: May 13, 2025

(54) AUDIO PLUG

(71) Applicant: Karim Messadek, Chanteloup-les-Vignes (FR)

(72) Inventor: Karim Messadek, Chanteloup-les-Vignes (FR)

( * ) Notice: Subject to any disclaimer, the term of this patent is extended or adjusted under 35 U.S.C. 154(b) by 443 days.

(21) Appl. No.: 17/903,162

(22) Filed: Sep. 6, 2022

(65) Prior Publication Data

US 2023/0075477 A1 Mar. 9, 2023

(51) Int. Cl.
*H01R 24/58* (2011.01)
*H01R 105/00* (2006.01)

(52) U.S. Cl.
CPC ......... *H01R 24/58* (2013.01); *H01R 2105/00* (2013.01)

(58) Field of Classification Search
None
See application file for complete search history.

(56) References Cited

U.S. PATENT DOCUMENTS

| | | | |
|---|---|---|---|
| 3,370,122 | A | 2/1968 | Mitsuji |
| 2014/0168528 | A1 | 6/2014 | Heo |
| 2017/0004907 | A1 | 1/2017 | Watanabe et al. |

FOREIGN PATENT DOCUMENTS

| | | |
|---|---|---|
| CN | 203631757 | 6/2014 |
| CN | 106099418 | 11/2016 |
| CN | 209766700 | 12/2019 |
| EP | 0347100 | 12/1989 |
| FR | 2510311 | 1/1983 |
| FR | 2550666 | 2/1985 |

*Primary Examiner* — Ross N Gushi
(74) *Attorney, Agent, or Firm* — PATENTFILE, LLC; Bradley C. Fach; Steven R. Kick

(57) ABSTRACT

An audio plug which comprises a head and a body, a through opening through the body having a rotational symmetry and being configured to allow the passage of at least two cables through the body, a shoulder being formed on the inner surface of the body to form a first cylindrical section on the upstream side and a second cylindrical section on the downstream side on the body, the audio plug further comprising a ring presenting a shoulder on its outer surface to form a first section with a diameter corresponding to the diameter of the first section of the body and a second section with a diameter corresponding to the diameter of the second section of the body, the ring presenting a through opening according to the longitudinal direction, at least one locking member being formed on the inner surface of the ring and being configured to lock the at least two cables relative to the ring, the ring being configured to be inserted into the body to cover the ends of the cables connected to the connection terminals before fixing the body to the head.

6 Claims, 5 Drawing Sheets

AUDIO PLUG

CROSS REFERENCES TO RELATED APPLICATION

The present application claims priority of French patent application no. 2109359 filed on Sep. 7, 2021, the content of which is incorporated by reference herein.

FIELD OF THE INVENTION

The present invention relates to the audio-visual field, and in particular relates to a multi-cable audio plug.

BACKGROUND OF THE INVENTION

Audio plugs are widely used in the audio-visual field and in particular for music.

The audio plugs are specific to the application. Most of the time, the audio plugs allow to connect only one cable. Therefore, there are audio plugs for mono applications, where the audio plug has one mono cable, and there are audio plugs for stereo applications, where the audio plug has one stereo cable. However, some audio plugs allow to connect two cables to one same plug simultaneously for hybrid applications, where a stereo-application audio plug has two mono cables (so-called Y or insert configuration) connected at the other end to two mono-application audio plugs.

With existing audio plugs, in which a body screws onto a plug head once the cable(s) is/are coupled to the plug head, the presence of multiple cables can lead to disconnection of the cable(s) from the plug head, due to friction of the body on the outer surface of the cables when screwing the body onto the plug head, or quite simply due to relative movements (twisting, wrapping) of the cables relative to each other resulting from subsequent handling of the plug and cable assembly, which leads to either a poor connection or a disconnection that requires unscrewing the body from the head to re-couple the cable(s) to the plug head.

BRIEF SUMMARY OF THE INVENTION

The present invention aims to overcome this drawback and relates to an audio plug configured to connect to the end of at least two audio cables, the audio plug comprising a head and a body configured to be attached to the head, the head comprising an audio connector portion and connection terminals configured to connect the audio connector portion to the at least two audio cables, a through opening being formed according to a longitudinal direction through the body between the upstream end of the body on the head side, which carries means for attachment to the head, and the downstream end, the through opening corresponding to the inner surface of the body having a rotational symmetry about the longitudinal direction and being configured to allow the passage of the at least two cables through the body from the downstream end to the connection terminals at the upstream end, wherein that a shoulder is further formed on the inner surface of the body to form two sections with rotational symmetry in the body, a first cylindrical section on the upstream side and a second section with rotational symmetry on the downstream side, the audio plug further comprising a ring presenting a shoulder on its outer surface to form two adjoined sections, a first cylindrical section presenting a diameter corresponding to the diameter of the first cylindrical section on the upstream side of the body and a second section presenting an outer surface corresponding to the inner surface of the second section with rotational symmetry on the downstream side of the body, the ring presenting a through opening according to the longitudinal direction, at least one locking member being formed on the inner surface of the ring, said at least one locking member being configured to lock the at least two cables relative to the ring, the ring being configured to be inserted into the body to cover the ends of the cables connected to the connection terminals before fixing the body to the head.

According to a specific embodiment, the audio plug comprises a head and a body configured to be attached to the head, the head comprising an audio connector portion and connection terminals configured to connect the audio connector portion to at least two audio cables, a through opening being formed according to a longitudinal direction through the body between the upstream end of the body on the head side, which carries means for attachment to the head, and the downstream end, the through opening corresponding to the inner surface of the body presenting rotational symmetry about the longitudinal direction and being configured to allow the passage of the at least two cables through the body from the downstream end to the connection terminals at the upstream end, wherein a shoulder is further formed on the inner surface of the body to form two cylindrical sections within the body, a first cylindrical section on the upstream side and a second cylindrical section on the downstream side with a smaller diameter than the first cylindrical section on the upstream side, the audio plug further comprising a ring, the outer surface of which presenting a shoulder to form two joined cylindrical sections, a first section with a diameter corresponding to the diameter of the first cylindrical section on the upstream side of the body and a second section with a diameter corresponding to the diameter of the second cylindrical section on the downstream side of the body, the ring presenting a through opening according to the longitudinal direction, at least one locking member being formed on the inner surface of the ring, said at least one locking member being configured to lock the at least two cables relative to the ring, the ring being configured to be inserted into the body to cover the ends of the cables connected to the connection terminals before fixing the body to the head.

The body is fixed to the head preferably by screwing. As a variant, the body can also be clipped onto the head, without departing from the scope of the present invention.

The ring according to the invention aims to prevent any tendency for the cables to twist (wrap) around each other, or even any separation (lateral movements) of the cables during the closing phase of the connector (screwing of the body) or during subsequent handling of the plug and cable assembly. These movements are detrimental to the integrity of the soldering points between the cables and the soldering lugs of the plug head.

According to one embodiment, the locking member is an oblong opening formed in at least one of the first section and the second section of the ring, the oblong shape having a major axis and a minor axis, the minor axis corresponding to the diameter of the cables. In the case of three cables, the locking member may be a triangular shaped opening, each side of the triangle having a length substantially corresponding to twice the diameter of the cables, or an oblong or slot-like shape having a major axis and a minor axis, the minor axis corresponding to the diameter of the cables, in order to ensure locking of the three cables in the opening.

According to one embodiment, the body is cylindrical. However, the body may have any other external shape, such as for example with a square section, without departing from the scope of the present invention.

According to one embodiment, the second section with rotational symmetry on the downstream side of the body and the second section of the ring are cylindrical.

According to one embodiment, the second section with rotational symmetry on the downstream side of the body comprises a portion with a constant diameter less than the diameter of the first cylindrical section on the upstream side of the body, and a portion with a decreasing diameter from the portion with a constant diameter towards the cable-side end of the body, the second section of the ring comprising in a corresponding manner a portion with a constant diameter and a portion with a decreasing diameter from the portion with a constant diameter towards the end of the ring, at least two openings being further formed in the lateral wall of the portion with a decreasing diameter to form jaws, such that when the ring is inserted into the body, the inner wall of the portion with a decreasing diameter presses against the jaws to bring the jaws closer together.

According to one embodiment, ridges are formed inside the jaws.

To better illustrate the object of the present invention, one embodiment thereof will be described hereinafter with reference to the appended drawings.

DETAILED DESCRIPTION OF THE INVENTION

Figure 1:
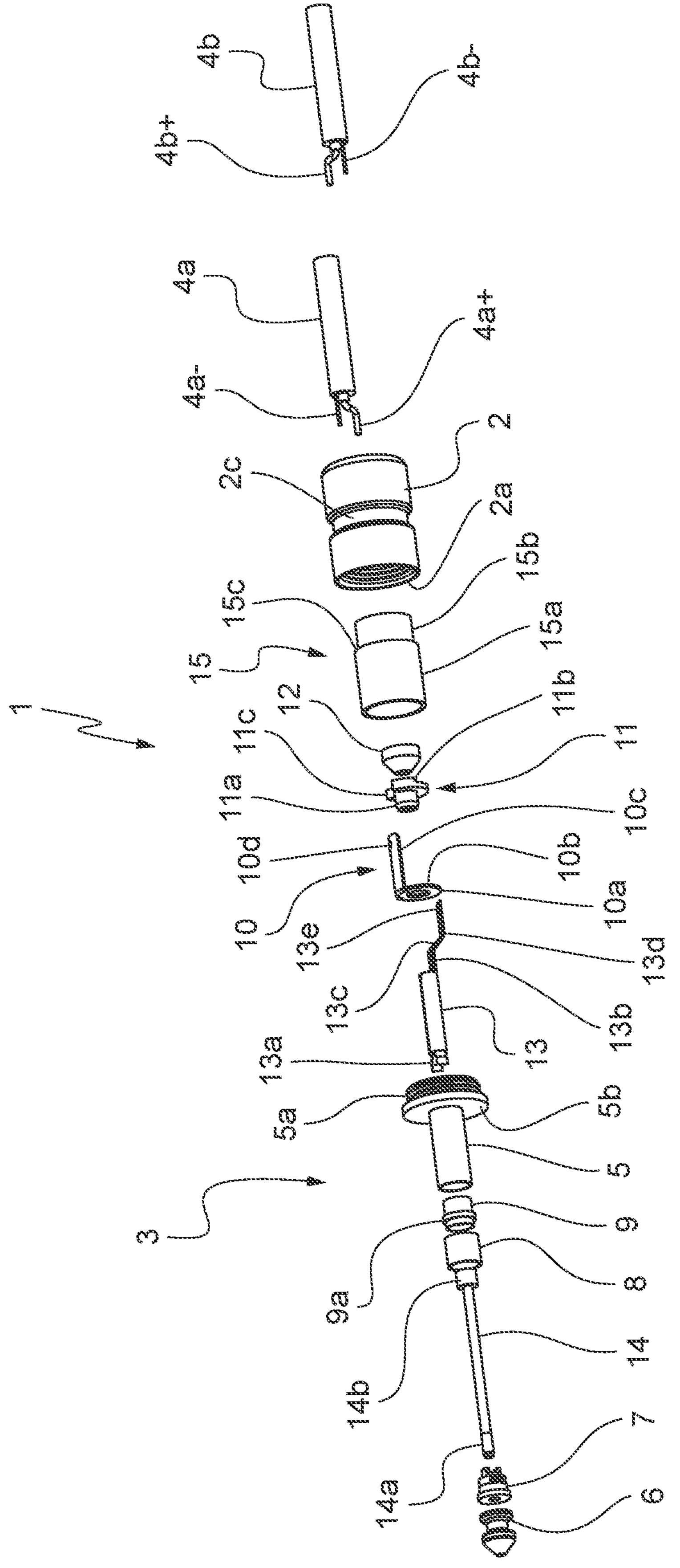
FIG. 1 is an exploded perspective view of an audio plug equipped with an anti-twist element according to a first embodiment of the present invention.
Figure 2:
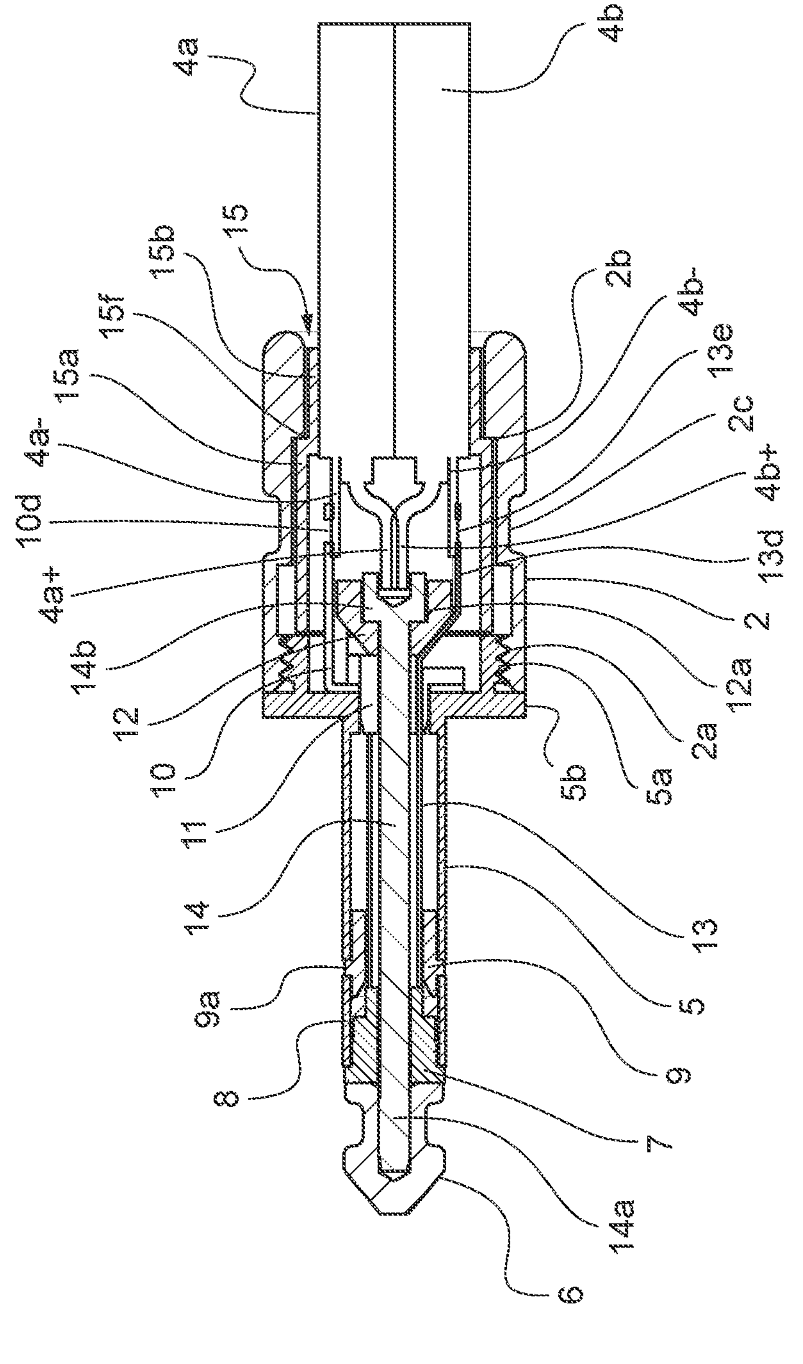
FIG. 2 is a cross-sectional view of the audio plug of FIG. 1.

In reference to FIG. 1 and FIG. 2, it can be seen that therein is shown an audio plug 1 equipped with an anti-twist element 15 according to a first embodiment of the present invention.

The audio plug 1, of conventional structure, comprises a cylindrical body 2 to which a head 3 carrying the audio connector is fixed, the body 2 allowing the head 3 to be connected to two cables **4*a* and 4*b* opposite the head 3 relative to the body 2**.

As shown, the body 2 has a groove **2*c* on its outer surface, serving to improve the grip of the body 2, whether for the audio plug 1 mounting operations described later or for gripping the audio plug 1 once mounted. However, other surface patterns can be envisaged instead of the groove 2*c***, such as the formation of a knurling-type surface effect, always with the objective to create frictions with the fingers for better gripping.

The head 3 comprises a sleeve 5 carrying a screw thread **5*a* configured to fix the sleeve 5 by screwing into a corresponding tapped hole 2*a* of the body 2, the body 2 coming into abutment at the end of the screwing against the sleeve 5 with a collar 5*b* which is formed on the sleeve 5 and adjoined to the screw thread 5*a*, the collar 5*b* having substantially the same diameter as the body 2**.

In the sleeve 5, are assembled, in order from the free end of the head 3 on the left in FIG. 1, a cone 6; a first insulating ring 7; a cylindrical intermediate ring 8 with the same diameter as the sleeve 5; a second insulating ring 9 presenting a collar **9*a* on its outer periphery, substantially of the same diameter as the diameter of the sleeve 5; a ground 10, the ground 10 being constituted by a washer 10*a* in which a central hole 10*b* is formed, a tab 10*c* extending perpendicularly to the plane of the washer 10*a* from an edge of the washer 10*a*, a hole 10*d* being formed at the end of the tab 10*c*; a third insulating ring 11, including a cylindrical core 11*a* on which a collar 11*b* is formed, a cutout 11*c* of the same width as the tab 10*c* being formed on the collar 11*b*; and a truncated cone-shaped spacer 12 in which a cylindrical chamber 12*a* is formed. The first insulating ring 7, the second insulating ring 9, the ground 10, the third insulating ring 11, and the spacer 12 all present a central opening for the passage of a sleeve 13 and of a connector pin 14** as described below.

The sleeve 13 and the connector pin 14 are further mounted into the head 3, the connector pin 14 comprising a first connection end **14*a* configured to connect to the cone 6 and a second connection end 14*b* configured to connect to the cables 4*a* and 4*b*. The second connection end 14*b* of the connector pin 14 is a cylindrical stop of larger diameter than the diameter of the connector pin 14, configured to fit into the cylindrical chamber 12*a* formed in the spacer 12. A clamp 13*a* is formed at one end of the sleeve 13, including two jaws configured to cooperate with the first insulating ring 7. A tab 13*b* extends from the other end of the sleeve 13, the tab 13*b* presenting an oblique step 13*c* extended by a leg 13*d* at the end of which a hole 13*e*** is formed.

In the assembled state of the head 3, the connector pin 14 is introduced by its second connection end **14*b* into the cylindrical chamber 12*a* of the spacer 12, then are successively assembled on the connector pin 14, by its first connection end 14*a*, the sleeve 13; the third insulating ring 11; the ground 10, the hole 10*b* of the washer 10*a* engaging on the core of the third insulating ring 11 and the tab 10*c* of the ground 10 passing through the cut-out 11*c* of the third insulating ring 11 diametrically opposite the tab 13*b* of the sleeve 13; the sleeve 5; the second insulating ring 9; the intermediate ring 8, the collar 9*a* of the second insulating ring 9 being interposed between the sleeve 5 and the intermediate ring 8; the first insulating ring 7, which hooks with the clamp 13*a* of the sleeve 13; and the cone 6**.

The cables **4*a* and 4*b* each have two terminals, respectively 4*a*+, 4*a*−, 4*b*+, 4*b*−, the terminals 4*a*− and 4*b*− being respectively connected to the tab 10*c* of the ground 10 (acting as a lug) and to the leg 13*d* of the sleeve 13 (acting as a lug), the terminals 4*a*+ and 4*b*+ being connected to the connector pin 14** (also acting as a lug).

Other connection modes are possible. For example, the terminals **4*a*− and 4*b*− may be simultaneously connected to the tab 10*c* of the ground 10, the terminals 4*a*+ and 4*b*+ being connected to the leg 13*d* of the sleeve 13 and to the connector pin 14**, respectively.

Figure 3:
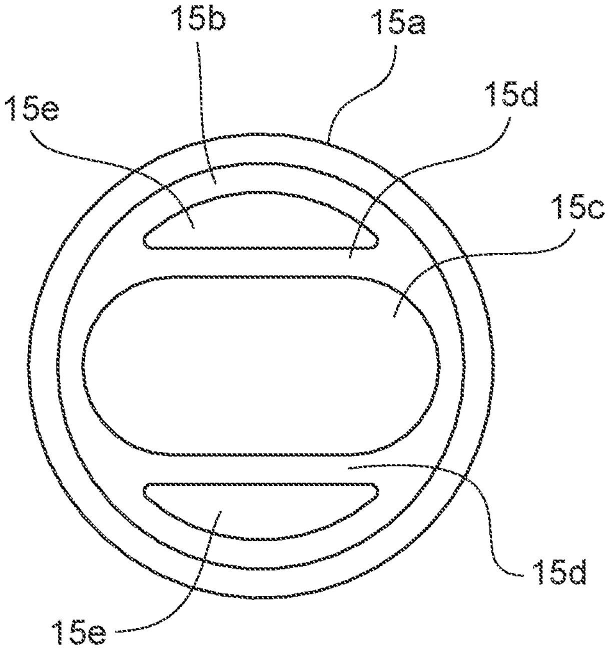
FIG. 3 is a front view of the anti-twist element of the first embodiment.
Figure 4:
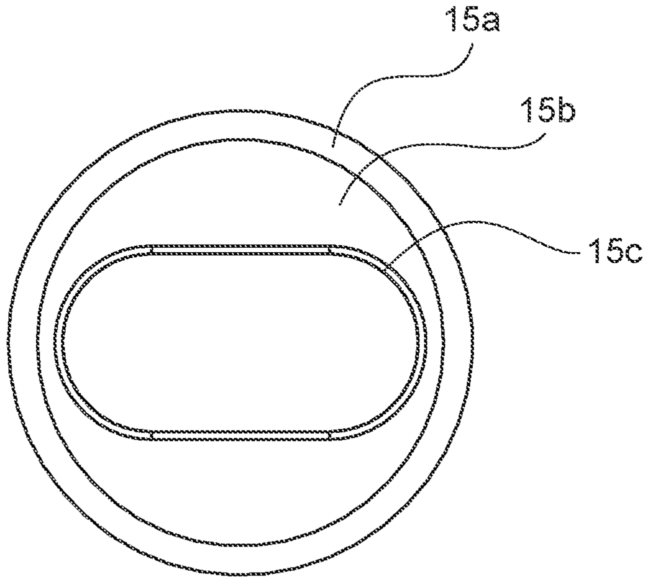
FIG. 4 is a rear view of the anti-twist element of the first embodiment.

The anti-twist element 15 is a ring, described in more detail in FIGS. 3 and 4.

The anti-twist element 15 is a ring that comprises two cylindrical sections with the same axis, adjoining each other and formed as a single piece, a first section 15*a* of larger diameter configured, when mounted into the plug 1, to face the head 3, and a second section 15*b* of smaller diameter configured to face the cables 4*a* and 4*b* when mounted into the plug 1.

As can be seen in FIG. 2, a shoulder 2*b* is formed inside the body 2, such that the diameter of the section 15*a* corresponds to the inner diameter of the body 2 before the shoulder and that the diameter of the section 15*b* corresponds to the inner diameter of the body 2 after the shoulder, forming a shoulder 15*f* on the outer surface of the ring 15 between the sections 15*a* and 15*b*.

In practice, the body 2 into which the ring 15 is inserted is placed on the cables 4*a* and 4*b* prior to mounting the head 3 on the body as described above.

The matching of the inner diameter of the body 2 and the outer diameter of the ring 15 allows, when the body 2 is screwed in, to freely rotate relative to the ring 15 wedging the assembly comprising the cables 4*a*, 4*b*, the ring 15 and the head 3, thus avoiding a twisting of the cables 4*a*, 4*b* when the plug 1 is mounted.

A flange 15*c* of substantially oblong shape, consisting of two semi-circles joined by straight lines, is formed in the second section 15*b* by two parallel chords 15*d*, the flange 15*c* having a width corresponding substantially to twice the cross-section of a cable and a height corresponding substantially to the diameter of a cable in order to wedge the two cables 4*a*, 4*b* adjoined in the flange 15*c*.

Once the cables 4*a*, 4*b* are soldered to the connector pin 14 on the one hand, and to the ground 10 and the sleeve 13 on the other hand, the ring 15 thus ensures that the cables 4*a*, 4*b* will not move relative to the head 3. As mentioned above, other possibilities for soldering/connecting the cables 4*a*, 4*b* are contemplated within the scope of the present invention.

The openings 15*e* formed in the second section 15*b* between the chords 15*d* and the periphery of the second section 15*b* allow for material savings.

It is understood that the shape of the flange 15*c* in the figures is not intended to limit the scope of the invention. Any cross-sectional shape suitable for holding the two cables adjoined together is considered within the scope of the present invention. Thus, a rectangular shape is considered within the scope of the present invention. Nor is it necessary for the chords 15*d* to be complete: lugs projecting according to the direction of the chords 15*d* but not joining are also possible within the scope of the present invention.

Figure 5:
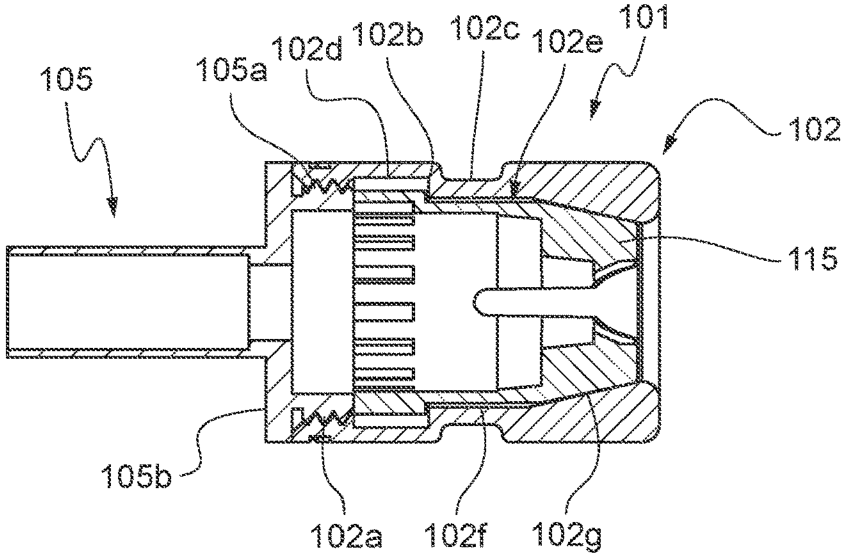
FIG. 5 is a cross-sectional view similar to FIG. 2 of a plug according to a second embodiment of the invention.
Figure 6:
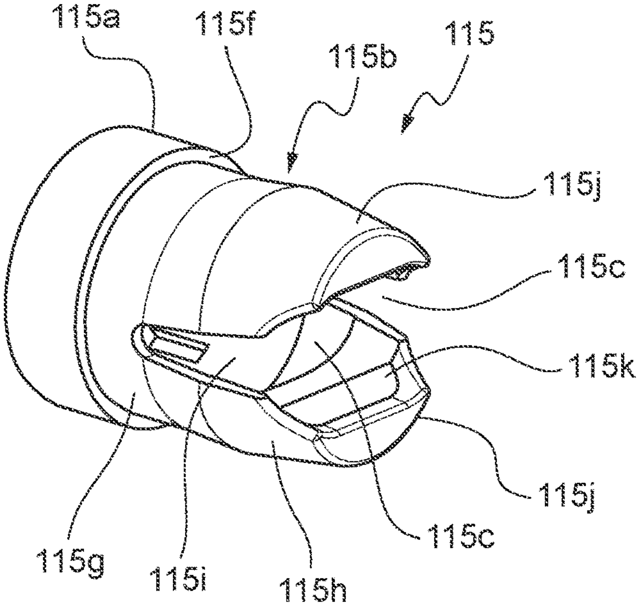
FIG. 6 is a rear perspective view of the anti-twist element of the second embodiment.
Figure 7:
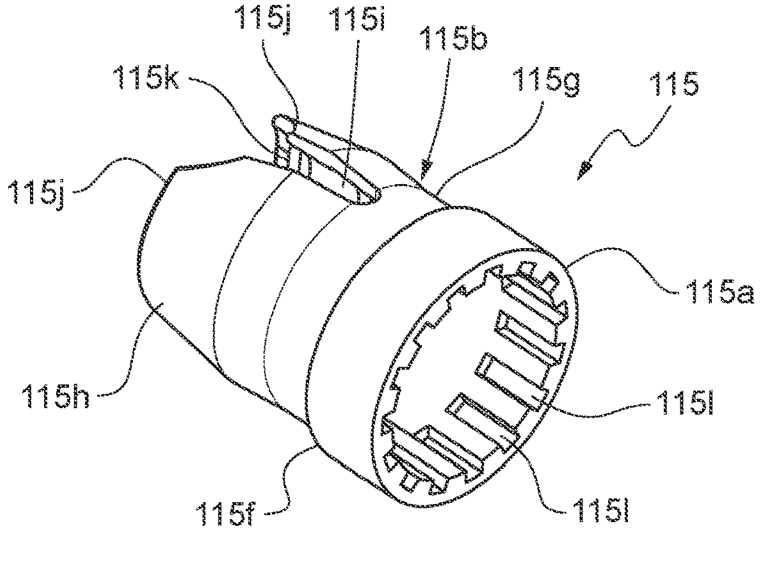
FIG. 7 is a front perspective view of the anti-twist element of the second embodiment.
Figure 8:
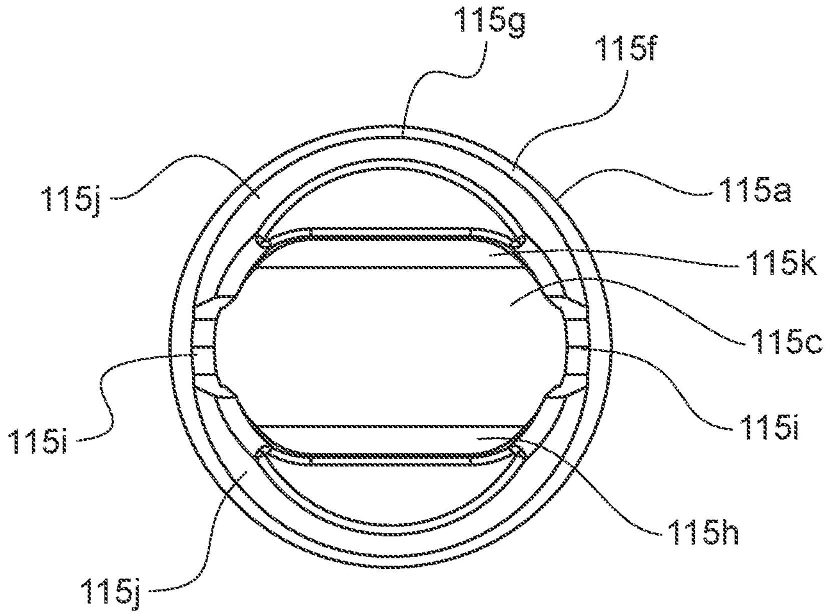
FIG. 8 is a rear view of the anti-twist element of the second embodiment.

In reference to FIGS. 5 to 7, it can be seen that a plug 101 is represented according to a second embodiment of the present invention.

In order not to make the description of this second embodiment heavy, only the elements which differ relative to the first embodiment are described and represented, namely the sleeve 105, the body 102 and the ring 115, the other elements introduced into the sleeve 105 as well as the cables being identical to the first embodiment and therefor are not described or represented again.

In this second embodiment, the audio plug 101 comprises a body 102, the sleeve 105 and the ring 115.

As with the first embodiment, the body 102 carries on its outer surface a groove 102*c*, serving to improve the grip of the body 102, whether for assembly operations of the audio plug 101 or for gripping the audio plug 101 once assembled. However, as with the first embodiment, other surface patterns may be considered instead of the groove 102*c*, such as the formation of a knurling-type surface effect, always with the objective to create frictions with the fingers for better gripping.

The body 102 comprises a shoulder 102*b* formed on the inner surface of the body 102 to form two cylindrical sections in the body 102, a first cylindrical section 102*d* on the sleeve 105 side and a second cylindrical section 102*e* on the downstream (cables) side with a smaller diameter than the first cylindrical section 102*d* on the upstream side.

A tapped hole 102*a* is formed on the end of the body 102 on the sleeve 105 side, to cooperate by screwing with the screw thread 105*a* formed behind the collar 105*b* formed on the sleeve 105.

The main difference with the first embodiment, concerning the body 102, is that the inner surface of the body 102, in the inner section with the smaller diameter 102*e*, comprises a first portion with a fixed diameter 102*f* and a second portion 102*g* with a diameter narrowing until the end on the cable side, the inner surface of the body 102 maintaining a rotational symmetry about its longitudinal axis (from left to right in FIG. 5).

The ring 115 presents in a corresponding manner two parts;

- a first part of large diameter 115*a*, destined to be housed in the first cylindrical section 102*d* on the sleeve 105 side of the body 102, the outer diameter of the first part 115*a* of the ring 115 corresponding to the inner diameter of the first cylindrical section 102*d* on the sleeve 105 side of the body 102, and
- a second part of smaller diameter 115*b*, presenting a part 115*g* of fixed diameter, destined to be housed in the first part of fixed diameter 102*f* of the second cylindrical section 102*e* on the cable side of the body 102, the outer diameter of the part 115*g* of the ring 115 corresponding to the inner diameter of the first part of fixed diameter 102*d* of the second cylindrical section 102*e* on the cable side of the body 102, and a part 115*h* of decreasing diameter from the part 115*g*, destined to be housed in the part 102*g* of the body 102, the first part 115*a* and the second part 115*b* being separated by a shoulder 115*f*.

Two openings 115*i*, formed on the lateral surface of the part 115*h* of the ring 115, form two jaws 115*j*, such that when the body 102 is screwed onto the sleeve 105, with the ring 115 inserted into the body 102, the inner wall of the part 102*e* of the body 102 lightly presses against the jaws 115*j* to tighten them on the cables and thus better maintain them.

It is understood that this part of the ring could include more openings, to form at this end of the ring a deformable part tightening around the cables under the effect of the tapered part 102*g* of the inner wall of the body 102.

Ridges 115*k* can be formed in the jaws 115*j* to better maintain the cables, by increasing friction with the cables. Even though one single ridge 115*k* transversal to the direction of the cables has been represented in the jaws 115*j*, it is understood that other types of ridges are possible. Thus, any surface increasing the friction, for example a textured surface, several parallel transversal ridges, discontinuous ridges, is possible.

Similarly, the ridges 115*k* are opposite each other in the jaws 115*j* but they can also be offset relative to each other or be with different numbers and different positions on each jaw 115*j*, without departing from the scope of the present invention.

As with the first embodiment, an opening of substantially oblong shape 115*c*, even though open at its longitudinal ends because of the openings 105*i* formed from the ends of the oblong shape 115*c* towards the cable-side end of the ring 115, is formed in the part 115*b* of the ring 115, still to maintain the cables once the audio plug 101 is mounted, the effect of supporting the cables being increased in the second embodiment by the clamping obtained by the jaws 115*j* which surround the oblong shape 115*c* and by the ridges 115*k*.

Finally, ribs 1151 are formed in the direction of the depth of the ring 115 in the inner surface of the first part of large diameter 115*a* of the ring 115, for material saving.

The ring 15 is preferably made of plastic material, for example polyethylene (PE), polypropylene (PP), polyvinyl chloride (PVC), polycarbonate (PC), nylon, injection molded in one piece. However, other materials such as Teflon (registered trademark), metal, especially aluminum, can also be considered to form the ring 15.

The body 2 is preferably made of metal (copper, steel, bronze, aluminum), machined or injection molded in one piece. However, other materials, such as plastics, can also be considered to form the body 2.

The invention is also not limited to the particular plug described with reference to the drawings. A ring according to the invention can be adapted to any type of plug to which at least two cables can be connected.

What is claimed is:

1. An audio plug configured to connect at least two cables, the audio plug comprising:

a head with a body configured to be attached to the head, the head comprising an audio connector portion and connection terminals configured to connect the audio connector portion to the at least two cables;

a through opening being formed according to a longitudinal direction through the body between an upstream end of the body located proximate to the head, which carries means for attachment to the head, and a downstream end, the through opening corresponding to an inner surface of the body having a rotational symmetry about the longitudinal direction and being configured to allow passage of the at least two cables through the body from the downstream end to the connection terminals at the upstream end;

wherein a first shoulder is further formed on the inner surface of the body to form two sections with rotational symmetry in the body, a first section on the upstream end on the inner surface of the body and a second section with rotational symmetry on the downstream end on the inner surface of the body;

the audio plug further comprising a ring presenting a second shoulder on its outer surface to form a first section of the ring and a second section of the ring;

the first section of the ring presenting a diameter corresponding to the diameter of the first section on the upstream end of the body and the second section of the ring presenting an outer surface corresponding to the inner surface of the second section of the body with rotational symmetry on the downstream end of the body; and the ring presenting a through opening according to the longitudinal direction, at least one locking member being formed on the inner surface of the ring with said at least one locking member being configured to lock the at least two cables relative to the ring and the ring being configured to be inserted into the body to cover the ends of the at least two cables connected to the connection terminals before fixing the body to the head.

2. The audio plug according to claim 1, wherein the locking member is an oblong opening formed in at least one of the first ring section and the second ring section of the ring, the oblong opening having a major axis and a minor axis, the minor axis corresponding to the diameter of the at least two cables.

3. The audio plug according to claim 2, wherein the body is cylindrical.

4. The audio plug according to claim 1, wherein the second section with rotational symmetry on the downstream end of the body and the second section of the ring are cylindrical.

5. The audio plug according to claim 1, wherein the second section with rotational symmetry on the downstream end of the body comprises a portion with a constant diameter less than the diameter of the first cylindrical section on the upstream end of the body, and a portion with a decreasing diameter from the portion with a constant diameter towards the downstream end of the body, the second section of the ring comprising in a corresponding manner a portion with a constant diameter and a portion with a decreasing diameter from the portion with a constant diameter towards the end of the ring, at least two openings being further formed in the lateral wall of the portion with a decreasing diameter to form jaws, such that when the ring is inserted into the body, an inner wall of the portion with a decreasing diameter presses against the jaws to bring the jaws closer together.

6. The audio plug according to claim 5, wherein ridges are formed inside the jaws.

* * * * *